May 15, 1956 C. T. BAKER, JR 2,745,956
DIODE PROTECTION CIRCUIT
Filed Dec. 31, 1951
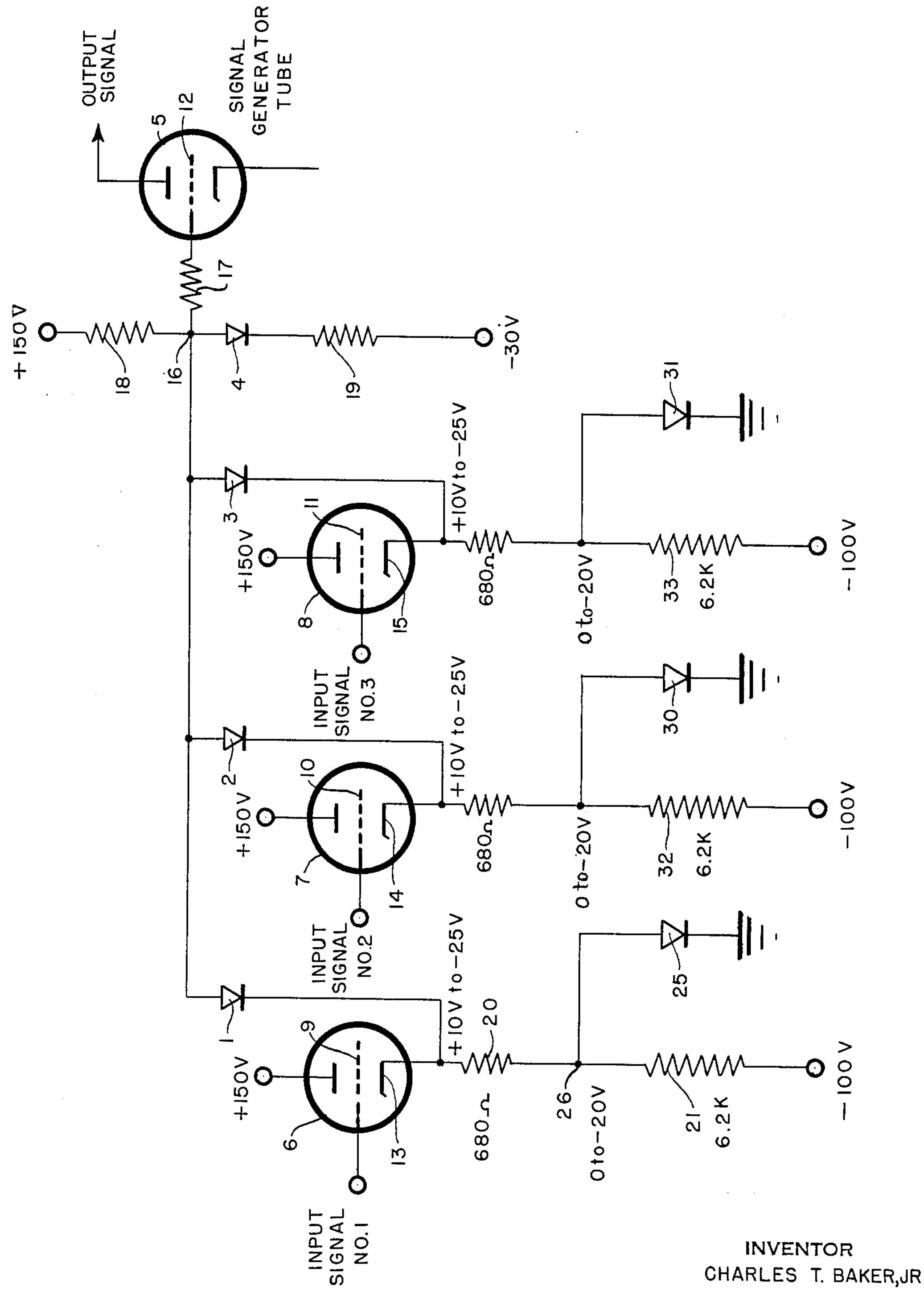
INVENTOR
CHARLES T. BAKER, JR
BY Charles P. Bobey
ATTORNEY United States Patent Office 2,745,956

Patented May 15, 1956

2,745,956

DIODE PROTECTION CIRCUIT

Charles T. Baker, Jr., Poughkeepsie, N. Y., assignor to International Business Machines Corporation, New York, N. Y., a corporation of New York Application December 31, 1951, Serial No. 264,309

2 Claims. (Cl. 250—27)

This invention relates to crystal diodes, and particularly to switch circuits or the like in which crystal diodes are driven by low-impedance voltage sources such as cathode followers.

This invention is specifically directed to diodes of the type commonly referred to in the art as crystal diodes. For the purposes of the invention the term crystal diode is interpreted to include electronic devices comprising solid materials having semi-conductive characteristics. Semi-conductive crystal diodes are constructed along two well-known lines, for example, they may have a cats-whisker contacting a block of semi-conductive material such as impure germanium, or silicon; or they may comprise two contacting blocks or layers of the same or different semi-conductive material, each block, however, having different electronic properties.

The invention has particular utility in connection with diodes of the semi-conductive class.

Where a crystal diode is driven by the voltage which apears across a shunt impedance of relatively low value, such as the cathode resistor of a cathode follower, there is always a danger that the diode will be damaged by a failure of the low-impedance path. This is true, for example, of coincidence switch circuits wherein crystal diodes are driven by cathode followers in such a fashion that if an open circuit should develop in a cathode resistor or in the cathode voltage supply, one or more of the diodes may be subjected to excessive reverse voltage. Under these circumstances a diode could fail completely, or it could undergo an alteration of its conduction characteristics without actually failing. If the diode fails completely, the effect upon the system usually is such that the operator is warned of the failure, and he can locate the fault readily by well-known circuit checking techniques. However, if the characteristics of the diode are changed without producing an outright failure, the fault then is likely to escape the operator's attention, causing the system to operate erroneously over a considerable period of time. A fault of this type is very difficult to detect, and its correction may involve a high loss of man-hours, to say nothing of the intangible damages, such as loss of good will, that might have occurred in the meantime.

In view of the foregoing, it is an object of this invention to provide an improved diode switch circuit wherein each of the switch diodes is amply protected against the damage that ordinarily would result from a failure of the voltage source driving the diode.

More specifically, it is an object of the invention to protect diode switches which are driven by cathode followers against the possibility of excessive reverse voltages caused by the failure of a cathode resistor or of the cathode voltage supply.

In carrying out the objects of the invention, I arrange an additional diode in each cathode follower driving circuit so as to limit the rise of cathode voltage that can occur if the supply of negative voltage to the cathode is interrupted. This has the effect of limiting the back voltage which is applied to the associated switch diode, thereby preventing any alteration of the diode characteristics. While the principle of the invention has special application to this type of circuit, however, it also has utility in other situations where a similar problem is likely to be encountered.

Other objects and features of the invention will be pointed out in the following description and claims and illustrated in the accompanying drawing, which discloses, by way of an example, the principle of the invention and the best mode, which has been contemplated, of applying that principle.

In the drawing there is shown a schematic representation of a diode switch circuit embodying the principle of the invention. The crystal diodes 1, 2, 3 and 4 constitute the elements of a four-way coincidence switch for controlling the voltage at the grid 12 of a signal generator tube 5. The diodes 1, 2 and 3, respectively driven by the cathode followers 6, 7 and 8, are the diodes which are to be protected from excessive reverse voltage. The diode 4 is subjected to a fixed bias and does not require such protection.

The tube 5 is incorporated in a signal generator circuit which produces an output signal in response to a coincidence of positive input signals at the control grids 9, 10 and 11 of the cathode followers 6, 7 and 8. Although the circuit is represented as being responsive to three concurrent input signals, it will be understood that a greater or lesser number of input signals may be employed, depending upon the conditions for which the system is designed. The output signal is furnished to a suitable signal-responsive device (not shown) in which the effect of the diode switching is manifested. For example, the output signal may be in the form of an unblanking pulse for an electrostatic data storage apparatus. It is contemplated also, within the scope of the invention, that the tube 5 itself may be a part of a storage unit such as a trigger or latch circuit. In brief, the tube 5 shown in the drawing symbolizes any device which is responsive to a plurality of variable voltages that are applied respectively to the switch diodes 1, 2 and 3.

The cathode terminals of the diodes 1, 2 and 3 are connected respectively to the cathodes 13, 14 and 15 of the cathode followers 6, 7 and 8. The anode terminals of the diodes 1, 2, 3 and 4 are connected in common to the point 16, which is connected through a parasitic suppressing resistor 17 to the control grid 12 of the tube 5. The point 16 also is connected through a resistor 18 to a positive 150-volt source. The cathode terminal of the diode 4 is connected through a resistor 19 to a negative 30-volt bias supply. The division of voltages tends to be such as to make the tube 5 conductive, subject however, to the action of the cathode followers 6, 7 and 8, as will be explained presently.

The system which is illustrated in the drawing is so designated that the cathode voltage of each cathode follower 6, 7 or 8 normally swings between the limits of plus 10 volts and minus 25 volts in response to the input signal. When the positive swings of all the cathode voltages coincides, the effect upon the switch diodes 1, 2 and 3 is such as to permit the grid 12 of the controlled tube 5 to assume a voltage above its cutoff value, thereby enabling conduction to take place in the tube 5. If, however, the timing of the input signals is such that the voltages of the cathodes 13, 14 and 15 do not achieve a positive coincidence, then one or more of the diodes 1, 2 and 3 (being negatively biased by the minus 100-volt cathode voltage supply of its cathode follower 6, 7 or 8) will act to prevent the voltage of grid 12 from rising above cutoff. Such functioning of the diodes 1, 2 and 3 and of the cathode followers 6, 7 and 8 is familiar to those skilled in the art.

Considering now the cathode follower 6 as an example, the cathode 13 of this device is connected to the minus 100-volt supply through a voltage divider comprising the resistors 20 and 21 arranged in series. Typical values for these resistors are indicated in the drawing, it being understood that these are given by way of example only. The cathode follower 6 may comprise any suitable thermionic tube such as a type 12AV7.

If by some chance the minus 100-volt cathode voltage supply should fail, thereby depriving the cathode resistor 21 of its minus 100-volt bias, there may be a tendency for the voltage of the cathode 13 to rise much higher than its normal upper limit of plus 10 volts (on the upper swing of the input signal). Usually a failure of the bias supply to a particular cathode follower is attended by other undesirable complications within the system of which the switch circuit is a part. Depending upon the combination of abnormal conditions which develops in the system, the voltage of the cathode 13 may exhibit a tendency to rise considerably higher than plus 10 volts. Unless this tendency of the cathode voltage to rise above a safe limit is checked, it will result in the application of an excessive reverse voltage upon the diode 1, thereby damaging this diode as noted hereinabove. The same result might occur also if the large cathode resistor 21 should burn out and become open-circuited, thus preventing any portion of the minus 100-volt bias from reaching the cathode 13. (Since the resistor 20 has a very low resistance as compared with the resistor 21, there is substantially no danger of burning out the resistor 20.)

In accordance with the principle of the invention, it is proposed to limit the positive swing of the cathode voltage of the cathode follower 6 by connecting a diode 25 between ground and the junction 26 of the resistors 20 and 21, with the cathode terminal of the diode 25 being grounded. The voltage of the junction 26 normally varies between 0 and minus 20 volts, corresponding to the cathode voltage swing of plus 10 volts to minus 25 volts. If, due to a failure of the negative 100-volt bias source or an open circuit in the cathode resistor 21, the voltage of the cathode 13 should attempt to rise above plus 10 volts, the voltage at the point 26 then will attempt to rise above ground potential. Diode 25 thereupon will conduct and afford a path to ground from the point 26. This is sufficient to prevent the cathode voltage from rising to an unsafe value; that is to say, it limits the reverse voltage acting upon the diode 1 so that the conduction characteristics of the diode 1 are not adversely affected.

The diodes 2 and 3 are similarly protected by diodes 30 and 31, which are arranged to bypass the cathode resistors 32 and 33 of the cathode followers 7 and 8 in the event of a failure in either of these cathode circuits. The presence of these protective measures in the system does not interfere with the routine checking of the circuits to locate faulty conditions therein.

While the protective scheme herein proposed is of a simple character, it actually solves a rather complex problem which has baffled engineers for several years. The alteration of crystal diode characteristics by excessive reverse voltages has been a troublesome cause of error in the operations of diode switch circuits and the like, and the usual practice has been to blame these changes in the diode properties upon irrelevant factors such as "aging." The result of this attitude has been such as to discourage the use of crystal diodes for this type of work. The present invention, however, serves to greatly increase the dependability of crystal diodes by automatically protecting them so that the diode conduction characteristics remain substantially constant over long periods of time, thereby offsetting the present unfavorable attitude toward the use of crystal diodes in work of this kind.

In practice, the cathode followers herein shown are mounted in pluggable units to facilitate their installation and replacement. Ordinarily, where the system is not protected against diode failure, it is necessary to shut down the high-voltage plate current supply when inserting or removing one of these pluggable units; otherwise there is a danger that plate voltage may be present at an instant when cathode bias is lacking, thereby subjecting the switch diodes to excessive reverse voltage. With protection for the diodes, however, the plate voltage need not be turned off while the change is being made. This is another advantage afforded by the present invention.

While hereinabove I have used the term crystal diode or simply diode, I intend that the scope of the invention will cover rectifiers of the junction or barrier layer type as well for they are subject to the same bad effects as are diodes of the cats-whisker type.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an electronic system having a source of voltages that are respectively positive and negative relative to ground, the combination of a cathode follower adapted to be supplied with plate current from a positive voltage terminal of said source and having a cathode connected by a resistor to a negative voltage terminal of said source, said cathode follower including a control grid responsive to input signals for varying the voltage of said cathode relative to ground, a voltage divider connected between the positive and negative voltage terminals of said source and having a point of variable voltage therein, a first crystal diode connected between said variable voltage point and said cathode and arranged to conduct current normally when said cathode is at a lower voltage than said variable voltage point, and a second crystal diode arranged to bypass at least a portion of said resistor whenever the voltage of said cathode tends to rise above a predetermined level relative to ground, thereby limiting the rise of cathode voltage and preventing the conductor characteristics of said first diode from being significantly altered due to excessive reverse voltage.

2. A coincidence switch circuit comprising a plurality of crystal diodes, a plurality of cathode followers each having a cathode connected to one of said diodes, with the corresponding diode being so arranged that a rise in the cathode voltage above a predetermined level tends to place a reverse voltage upon said diode, said cathode followers including a cathode resistor respectively adapted to connect the cathodes thereof to points of lower voltage, and protective diodes for the first-mentioned crystal diodes, each of said protective diodes being arranged in parallel relation across a part of said cathode resistor and adapted to conduct current whenever the voltage of the related cathode tends to rise above a given level, whereby the cathode voltages are prevented from attaining such values as would cause the conduction characteristics of the first-mentioned diodes to undergo significant alteration due to excessive reverse voltages.

References Cited in the file of this patent

UNITED STATES PATENTS

| | | |
|---|---|---|
| 1,153,172 | Bushbeck | Apr. 4, 1939 |
| 2,473,853 | Boykin | June 21, 1949 |
| 2,515,224 | Holritz | July 18, 1950 |
| 2,553,284 | Sunstein | May 15, 1951 |
| 2,594,916 | Gulnac | Apr. 29, 1952 |
| 2,693,533 | Femmer | Nov. 2, 1954 |
| 2,698,883 | Martin | Jan. 4, 1955 |